United States Patent
Reymond et al.

(10) Patent No.: US 12,375,263 B2
(45) Date of Patent: Jul. 29, 2025

(54) PROTECTION OF A CIPHER ALGORITHM

(71) Applicant: STMICROELECTRONICS (ROUSSET) SAS, Rousset (FR)

(72) Inventors: Guillaume Reymond, Luynes (FR); Thomas Sarno, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 609 days.

(21) Appl. No.: 17/347,369

(22) Filed: Jun. 14, 2021

(65) Prior Publication Data

US 2021/0391977 A1    Dec. 16, 2021

(30) Foreign Application Priority Data

Jun. 16, 2020    (FR) ...................................... 2006277

(51) Int. Cl.
*H04L 9/00*    (2022.01)
*H04L 9/06*    (2006.01)

(52) U.S. Cl.
CPC ........ *H04L 9/065* (2013.01); *H04L 2209/046* (2013.01)

(58) Field of Classification Search
CPC ............... H04L 9/065; H04L 2209/046; H04L 2209/043; H04L 2209/122; H04L 9/003;
(Continued)

(56) References Cited

U.S. PATENT DOCUMENTS

2013/0132706 A1*  5/2013  Trichina ................... G06F 7/76
                                                        711/211
2015/0098564 A1*  4/2015  Chamley ............... H04L 9/0631
                                                        380/28
(Continued)

FOREIGN PATENT DOCUMENTS

CN         108369784 A      8/2018
WO    WO-2004070510 A2 *    8/2004    ............... G06F 7/00

OTHER PUBLICATIONS

Y. Wang and Y. Ha, "A Performance and Area Efficient ASIP for Higher-Order DPA-Resistant AES," in IEEE Journal on Emerging and Selected Topics in Circuits and Systems, vol. 4, No. 2, pp. 190-202, Jun. 2014, doi: 10.1109/JETCAS.2014.2315877 (Year: 2014).*

(Continued)

*Primary Examiner* — Syed M Ahsan
(74) *Attorney, Agent, or Firm* — Seed IP Law Group LLP (57) ABSTRACT

A cryptographic device includes hardware data processing circuitry and software data processing circuitry coupled to the hardware data processing circuitry. The device, in operation, executes a plurality of rounds of a symmetrical data cipher algorithm and protects the execution of the plurality of rounds of the symmetrical data cipher algorithm. The protecting includes executing data masking and unmasking operations using the hardware data processing circuitry, executing linear operations applied to data using the software data processing circuitry, executing linear operations applied to masks using the hardware data processing circuitry, and executing non-linear operations applied to data using one of the hardware data processing circuitry or the software data processing circuitry.

28 Claims, 6 Drawing Sheets

(58) Field of Classification Search
CPC ....... H04L 9/0631; G09C 1/00; G06F 21/602;
G06F 21/64
See application file for complete search history.

(56) References Cited

U.S. PATENT DOCUMENTS

| | | | |
|---|---|---|---|
| 2016/0269175 A1* | 9/2016 | Cammarota | ............ H04L 9/002 |
| 2018/0089467 A1* | 3/2018 | Pedersen | ............... H04L 9/0631 |
| 2018/0167196 A1* | 6/2018 | Cooper | ................... H04L 9/003 |
| 2019/0296898 A1* | 9/2019 | De Mulder | ............. H04L 9/085 |
| 2020/0322127 A1* | 10/2020 | Lozac'h | ................ H04L 9/0618 |

OTHER PUBLICATIONS

Wang et al., "A Performance and Area Efficient ASIP for Higher-order DPA-resistant AES," *IEEE Journal on Emerging and Selected Topics in Circuits and Systems* 4(2): 190-202, 2014.

\* cited by examiner

PROTECTION OF A CIPHER ALGORITHM

BACKGROUND

Technical Field

The present disclosure generally relates to computer security, and more particularly to the implementation of a cipher algorithm. More particularly, the present disclosure relates to the implementation of a symmetrical cipher algorithm.

Description of the Related Art

In the field of information security, cipher algorithms are commonly used to ensure the protection of data used by an electronic device.

Cipher algorithms generally use cipher and/or decipher keys to cipher data. A symmetrical cipher algorithm is an algorithm using the same key, be it to cipher and to decipher data, the key then being called cipher and decipher key.

Among the different types of known symmetrical cipher algorithm, symmetrical cipher algorithm "in circles" or "in rounds" are algorithms where one or a plurality of mathematical and/or logical operations are applied several successive times to data to be ciphered.

BRIEF SUMMARY

An embodiment facilitates implementations of cipher algorithms, said to be "in rounds," which are less sensitive to physical attacks.

An embodiment facilitates implementations of faster symmetrical cipher algorithms said to be "in rounds."

An embodiment facilitates implementations of faster symmetrical cipher algorithms said to be "in rounds" using more compact physical circuits.

One embodiment provides a method of implementation, by an electronic device, of a symmetrical data cipher algorithm in rounds comprising the steps implementing:
data masking and unmasking operations performed in hardware fashion;
linear operations applied to the data in software fashion; and
non-linear operations in software or hardware fashion.

One embodiment provides an electronic device capable of implementing a symmetrical cipher algorithm comprising the steps implementing:
data masking and unmasking operations in hardware fashion;
linear operations applied to the data in software fashion; and
non-linear operations in software or hardware fashion.

According to an embodiment, the symmetrical data cipher algorithm comprises a data path and a key path, said masking and unmasking operations, said linear operations, and said non-linear operations being operations of the data path.

According to an embodiment, said masking and unmasking operations comprise masking operations, unmasking operations, and mask refreshment operations.

According to an embodiment, each non-linear operation is followed by a masking or unmasking operation.

According to an embodiment, each non-linear operation is followed by a mask refreshment operation.

According to an embodiment, each non-linear operation is followed by a masking operation.

According to an embodiment, each non-linear operation is preceded by a masking and unmasking operation.

According to an embodiment, each non-linear operation is preceded by an unmasking operation.

According to an embodiment, each non-linear operation is preceded by a mask refreshment operation.

According to an embodiment, said mask refreshment operations are implemented by using a lookup table.

According to an embodiment, the cipher algorithm comprises steps implementing lookup table refreshment operations.

According to an embodiment, said non-linear operations are implemented by using a lookup table.

According to an embodiment, the cipher algorithm is a block cypher algorithm, for example: AES (Advanced Encryption Standard), SM4, and GOST R 34.12-2015, or a stream cypher algorithm.

According to an embodiment, the cipher algorithm in rounds uses a masking using a logical addition function.

BRIEF DESCRIPTION OF THE SEVERAL VIEWS OF THE DRAWINGS

The foregoing example features and advantages, as well as others, will be described in detail in the following description of specific embodiments given by way of illustration and not limitation with reference to the accompanying drawings, in which.

DETAILED DESCRIPTION

Like features have been designated by like references in the various figures, unless the context indicates otherwise. In particular, the structural and/or functional features that are common among the various embodiments may have the same references and may dispose similar or identical structural, dimensional and material properties.

For the sake of clarity, only the steps and elements that are useful for an understanding of the embodiments described herein have been illustrated and described in detail. In particular, the different calculation operations implemented by the cipher algorithm will not be detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify, for example, within 10%, within 5%.

Figure 1:
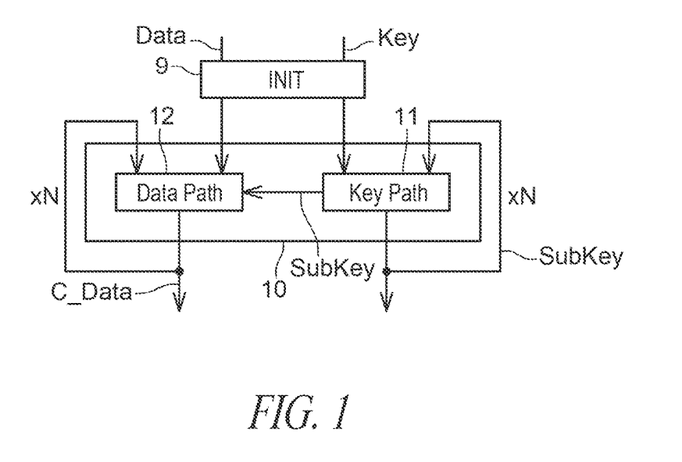
FIG. 1 schematically shows in the form of blocks a schematic diagram of the execution of an embodiment of a symmetrical cipher algorithm said to be "in rounds"

FIG. 1 schematically shows in the form of blocks a schematic diagram of execution of a symmetrical cipher algorithm said to be "in rounds," or symmetrical cipher algorithm in rounds, or also cipher algorithm in rounds.

A symmetrical cipher algorithm in rounds executed by an electronic circuit generally enables to transform a message formed by a plain data Data, with a secret key Key to obtain ciphered data C_Data.

The execution of the cipher algorithm is an iterative cipher or processing process.

Such an iterative treatment comprises applying to plain data Data and to key Key one or a plurality of successive mathematical and/or logic operations, shown in FIG. 1 as a block 10, for a plurality of rounds, or a plurality of cycles. As an example, the operations of block 10 are applied for a number N of rounds (xN).

The cipher algorithm may for example start with an optional initialization step 9 (INIT), enabling to prepare data Data and key Key at the next steps. As an example, the initialization step may be a first masking step of the data Data to be ciphered.

At each round, it is started by calculating a sub-key SubKey based on the secret key Key or on the sub-key SubKey of the previous round. The set of mathematical and/or logic operations applied at each round to key Key, or to sub-key SubKey, is called key path (block 11, Key Path). Then, sub-key SubKey is used to transform or cipher data Data.

To cipher data Data, a set of mathematical and/or logic operations is applied to data Data, or to the ciphered data C-Data of the previous round, at each round, using key Key, or sub-key SubKey. The set of mathematical and/or logic operations applied at each round to data Data, or to ciphered data C_Data, is called data path (block 12, Data Path). The set formed by the key path and the data path will then be called round function of the cipher algorithm.

Data C_Data ciphered with sub-key SubKey are then obtained at the end of a round. Ciphered data C_Data are then fed back into the processing or cipher process, thus playing the role, at the next round, of input data for the application of round function 10. Similarly, each new sub-key SubKey is, at the output of a round, fed back to enable to generate the sub-key of the next round.

At the end of the number N of rounds, the ciphered data C_Data obtained by the last application of round function 110 form the final ciphered data C_Data.

In other words, the symmetric cipher algorithm or process in rounds successively comprises:
- an initialization step 9;
- a first round, during which the round function is applied to data Data and to key Key;
- a number of intermediate rounds (N−2 rounds, in this example), for each of which a new sub-key SubKey is calculated, and during which round function 10 is applied to the ciphered data C_Data and to the sub-key SubKey resulting from the application of the function at the previous round; and
- a final round, at the end of which the processing of the last ciphered data, by a last application of the round function, results in the obtaining of the final ciphered data C_Data.

Number N of rounds is also called number of iterations. Number N of rounds generally depends on the used cipher algorithm, and on the size of the secret key Key.

The round function 10, applied at each round, is for example comprised of substitution, row shifting, and column mixing operations, followed by a combination (for example, XOR) with the sub-key SubKey of the considered round. Round function 10 typically aims at obtaining an algorithm provided with properties of confusion (that is, as complex a relation as possible between the secret key and the plain message) and of diffusion (that is, a dissipation, in the statistics of the ciphered message, of a statistic redundancy of the plain message). Such is typically the case for an AES- or SM4-type algorithm.

The algorithm may also comprise secondary masking operations enabling to add a protection level to the data Data to be ciphered during the application of the round function. Such operations enable to protect the data from an attack during the application of the cipher algorithm.

Figure 2:
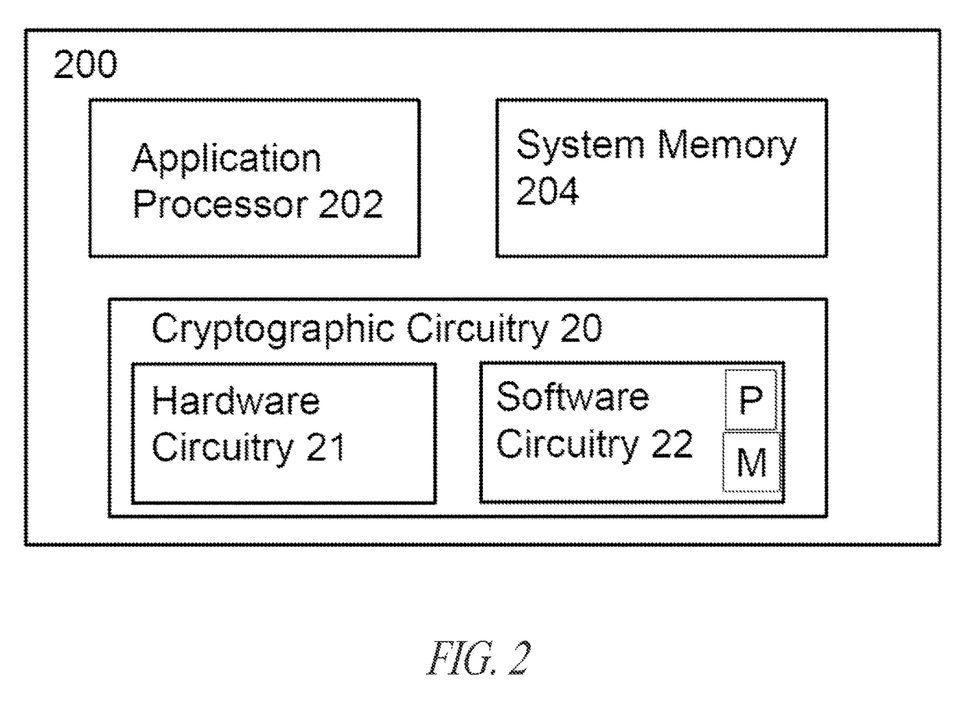
FIG. 2 schematically shows in the form of blocks an electronic device.

FIG. 2 schematically shows in the form of blocks an electronic device 20.

Electronic device 20 is an electronic device capable of implementing a cipher algorithm in rounds of the type of that described in relation with FIG. 1. Device 20 may be a security or cryptographic circuit of a system 200, which as illustrated includes an application processor 202 and a system memory 204. System 200 may be, for example, a smart phone or other electronic device, which may employ the security or cryptographic circuit 20, for example, to authenticate a transaction initiated by the application processor, a communication received by the application processor, etc.

Device 20 comprises an assembly 21 (HW) of circuits capable of implementing mathematical and/or logic operations. Assembly 21 may for example comprise memory elements, such as lookup tables, logic circuits, etc. The mathematical and/or logic operations are for example used to implement said cipher algorithm in rounds.

Device 20 is further capable of implementing a set 22 (SW) of instructions and software to execute mathematical and logic operations. Set 22 is for example implemented by a single processor (processor P as shown) or by a plurality of different processors executing one or more sets of instructions stored in a memory M. As previously, the mathematical and/or logic operations are for example used to implement said cipher algorithm in rounds.

As described in relation with FIG. 1, the cipher algorithm implemented by device 20 applies a data path to data to be masked and a key path to a key, and this, for a number N of rounds. The data path and the key path of the cipher algorithm are more particularly formed of a plurality of mathematical and/or logic operations. Such operations may have different characteristics, such as the fact of being linear or non-linear, and different purposes, such as that of ciphering the data or that of performing an operation of secondary masking and/or unmasking of the data. In the following description, it is considered that the data path is formed of a succession of one or a plurality of linear cipher operations applied to the data to be ciphered, of one or a plurality of non-linear cipher operations applied to the data to be ciphered, and of one or a plurality of secondary masking and/or unmasking operations. Hereafter, the following terms are used:

"linear operation" for a linear mathematical and/or logical operation;

"non-linear operation" for a non-linear mathematical and/or logical operation; and "masking operation" or "unmasking operation" for an operation aiming at a secondary masking or unmasking.

According to an embodiment, device 20 is capable of implementing the linear operations in software form, that is, by using the set 22 of instructions and of software that it is capable of implementing. Device 20 is capable of implementing the non-linear operations in software or hardware fashion, that is, by using assembly 21 of circuits. The masking and unmasking operations are operations enabling to ensure the masking of the data to be ciphered by a mask during the execution of the linear and non-linear operations. Such masking and unmasking operations are implemented by device 20 in hardware fashion. According to an embodiment, the type of masking used during the execution of the cipher algorithm is a type of masking subsisting the linear operations. In other words, if the mask is submitted to the same linear operations as the masked data, then the unmasking is possible by using said mask. As an example, a type of masking verifying this condition is a masking executing an XOR operation where the data to be masked are combined with a mask by an logical addition operation, for example a XOR logic operation.

As an example, a similar treatment may be applied to the operations forming the key path of the cipher algorithm.

A plurality of implementation modes of the cipher algorithm implemented by device 20 are described in relation with FIGS. 3 to 7. More particularly, in the example of FIGS. 3 to 7, the data path of the cipher algorithm implemented by device 20 is successively formed of a first linear operation, of a non-linear operation, and of a second linear operation. The distribution of the masking or unmasking operations is described in relation with FIGS. 3 to 7. However, as a variation, the data path of the cipher algorithm implemented by device 20 might comprise one or more than two linear operations and more than two non-linear operations, arranged in any manner.

Figure 3:
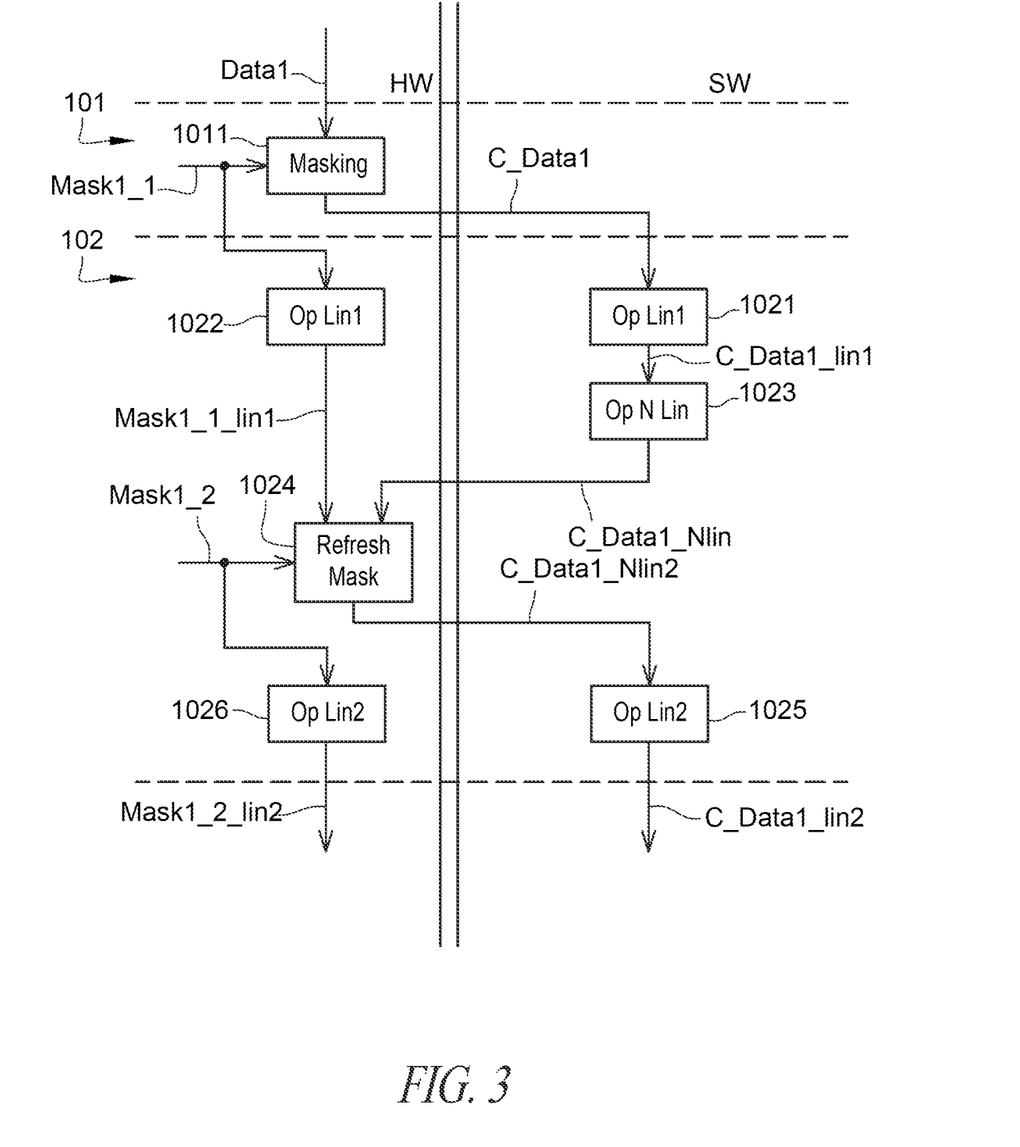
FIG. 3 schematically shows in the form of blocks steps of a protected implementation mode of a symmetrical cipher algorithm.

FIG. 3 schematically shows in the form of blocks steps of an implementation mode of the symmetrical cipher algorithm of the device 20 described in relation with FIG. 2.

In the example described in relation with FIG. 3, the non-linear operation of the data path is implemented in software fashion.

In FIG. 3, the operations shown on the left-hand side of the drawing are implemented in hardware fashion (HW) and the operations shown on the right-hand side of the drawing are implemented in software fashion (SW).

Further, the upper portion of the drawing shows the execution of the operations of an initialization step 101 (delimited in dotted lines) of the cipher algorithm and the lower portion of the drawing shows the execution of the operations of data path 102 (delimited in dotted lines) during a first round.

At initialization step 101, data Data1 to be ciphered are masked with a mask Mask1_1 during a masking operation 1011 (Masking). Masking operation 1011 delivers masked data C_Data1. Data Data1 is represented as coming from the hardware part of the device executing the cipher algorithm, but, according to a variant, data Data1 may come from the software part of the device.

Then, the operations of data path 102 are executed. To begin with, a first linear operation 1021 (Op Lin 1) is applied to masked data C_Data1 in software fashion. The result of operation 1021 is masked data C_Data1_lin1. A first linear operation 1022 (Op Lin 1), identical to operation 1021 is, in parallel, applied to mask Mask1_1 of masked data C_Data1, in hardware fashion. The result of operation 1022 is a mask Mask1_1_lin1. At this stage, it is possible to unmask masked data C_Data1_lin1 with mask Mask1_1_lin1 to obtain the result of the application of operation 1021 to the data to be ciphered Data1.

The execution of data path 102 continues with the application of a non-linear operation 1023 (Op N Lin) to data C_Data1_lin1, in software fashion. The result of operation 1023 is masked data C_Data1_Nlin.

The next operation then is a mask refreshment operation 1024 (Refresh Mask) carried out in hardware fashion. During this operation, data C_Data1_Nlin are modified into data C_Data1_Nlin2 masked by another mask Mask1_2. Mask Mask1_2 may be different or not from mask Mask1_1. Having a mask Mask1_2 different from mask Mask1_1 enables to increase the protection of the data to be ciphered. According to an embodiment, refreshment operation 1024 comprises the successive steps of:

application of an operation inverse to non-linear operation 1023 to data C_Data1_Nlin to recover data C_Data1_lin1;

unmasking of data C_Data1_lin1 with mask Mask1_1_lin1;

application of non-linear operation 1023 to unmasked data C_Data1_lin1; and masking with mask Mask1_2 to obtain masked data C_Data1_Nlin2.

The execution of data path 102 continues with the application of a second linear operation 1025 (Op Lin 2) to masked data C_Data1_Nlin2 in software fashion. The result of operation 1025 is masked data C_Data1_lin2. A second linear operation 1026 (Op Lin 2), identical to operation 1025 is, in parallel, applied to mask Mask1_2 of masked data C_Data1_Nlin2 in hardware fashion. The result of operation 1026 is a mask Mask1_2_lin2. At this stage, it is possible to unmask masked data C_Data1_lin2 with mask Mask1_2_lin2.

The operations of data path 102 are finished for the first round. Data C_Data1_lin2 and mask Mask1_2_lin2 may be fed back instead of, with respect to, data C_Data1 and of mask Mask1_2_lin2 to start the next round.

As a summary, to apply the data path, each linear operation is applied in parallel to the masked data in software fashion and to its mask in hardware fashion. Further, each non-linear operation is followed by a mask refreshment operation. According to a variant, if a linear operation does not modify the mask, then said operation is not applied to the mask in parallel with the masked data.

An advantage of his implementation mode is that it provides a protected implementation of the cypher algorithm. In other words, it provides a countermeasure to some physical attacks allowing, for example, the identification of the used cypher algorithm.

Another advantage of this implementation mode is that the operations of the cipher algorithm are implemented in software fashion and in hardware fashion, which makes a physical attack more difficult to implement.

Another advantage of this embodiment is that, during all the cipher operations of the algorithm, the data to be ciphered are masked.

Another advantage of the embodiment is that it reduces the use of hardware circuits, in comparison with a totally hardware implementation of the same cypher algorithm.

Figure 4:
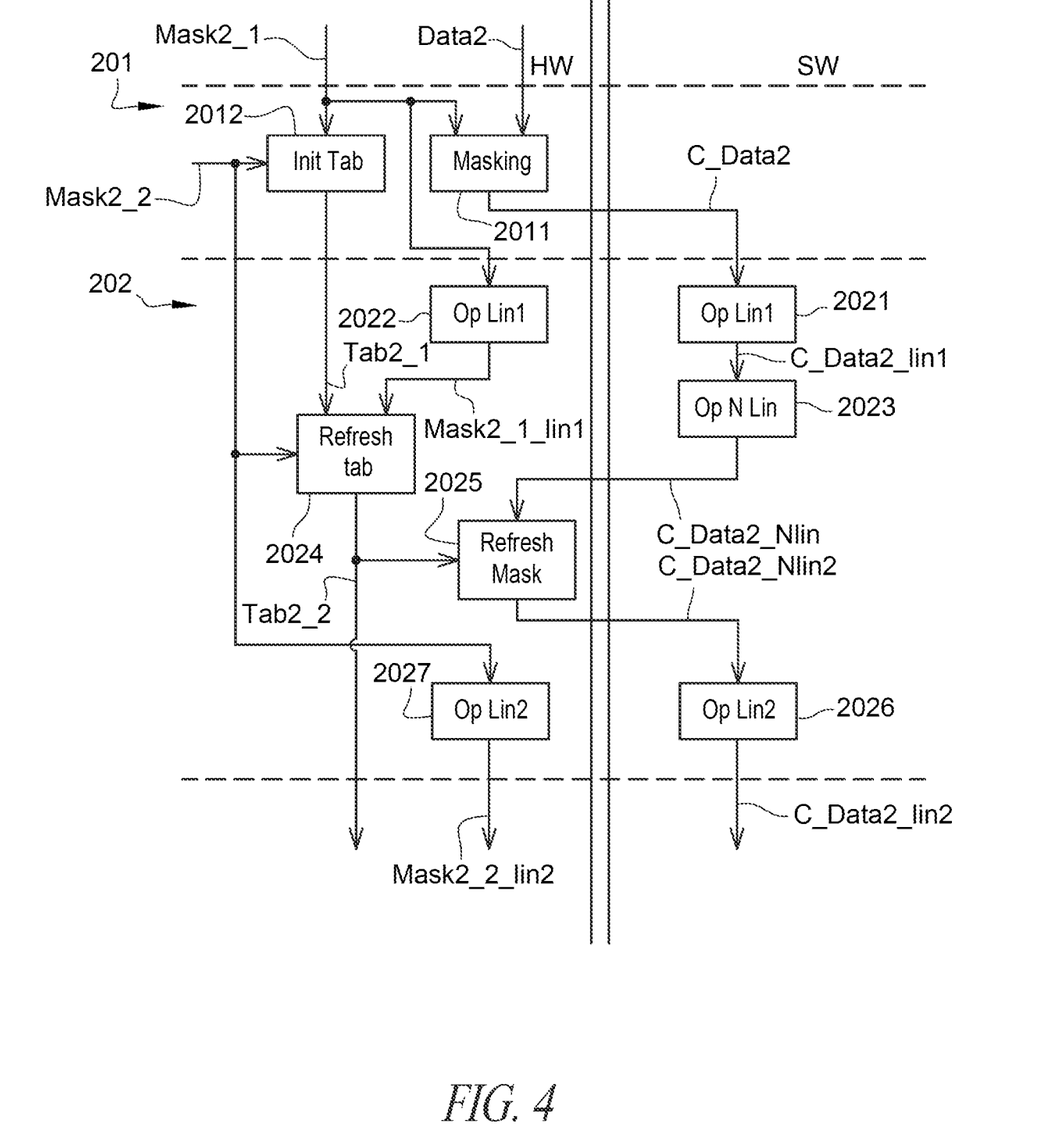
FIG. 4 schematically shows in the form of blocks steps of another protected implementation mode of a symmetrical cipher algorithm.

FIG. 4 schematically shows, in the form of blocks, steps of another implementation mode of the symmetrical cipher algorithm of the device 20 described in relation with FIG. 2.

In the example described in relation with FIG. 4, the cipher algorithm is based on the use of a lookup table to perform mask refreshment operations. The initialization step and the data path of the algorithm are similar to the initialization step and to the data path described in relation with FIG. 3, but further comprise lookup table initialization and refreshment operations.

As described in FIG. 3, the non-linear operation of the data path is here implemented in software fashion in the example described herein.

In FIG. 4, as in FIG. 3, the operations shown on the left-hand side of the drawing are implemented in hardware fashion (HW) and the operations shown on the right-hand side of the drawing are implemented in software fashion (SW).

Further, the upper portion of the drawing shows the execution of the operations of an initialization step 201 (delimited in dotted lines) of the cipher algorithm and the lower portion of the drawing shows the execution of the operations of data path 202 (delimited in dotted lines) during a first round.

At initialization step 201, data Data2 to be ciphered are masked with a mask Mask2_1 during a masking operation 2011 (Masking). Masked data C_Data2 are then supplied. Data Data2 is represented as coming from the hardware part of the device executing the cipher algorithm, but, according to a variant, data Data2 may come from the software part of the device.

Further, an operation of initialization 2012 (Init Tab) of a lookup table is executed, where a lookup table Tab2_1 is created. Lookup table Tab2_1 enables to perform a mask refreshment operation without having to perform a calculation. More particularly, the lookup table enables to associate with each value that data can take the value resulting from the application of one or a plurality of operations. In the case in point, in the example of FIG. 4, the lookup table enables to associate with each value that data can take the value resulting from the application, consecutively:

of an operation of unmasking of the data by using mask Mask2_1;
of a non-linear operation 2023 described hereafter; and
of an operation of masking with a mask Mask2_2.

According to a variation, during operation 2012, the lookup table may be created at this operation (e.g., without associated values), and may be filled during a subsequent operation.

Then, the execution of data path 202 starts with the application of a first linear operation 2021 (Op Lin 1) to masked data C_Data2 in software fashion. The result of operation 2021 is masked data C_Data2_lin1. A first linear operation 2022 (Op Lin 1), identical to operation 2021 is, in parallel, applied to mask Mask2_1 of masked data C_Data2, in hardware fashion. The result of operation 2022 is a mask Mask2_1_lin1. At this stage, it is possible to unmask masked data C_Data2_lin1 with mask Mask2_1_lin1.

The execution of data path 202 continues with the application of a non-linear operation 2023 (Op N Lin) to data C_Data2_lin1, in software fashion. The result of operation 2023 is masked data C_Data2_Nlin.

An operation 2024 of refreshment of lookup table Tab2_1 is executed. During this step, the data of lookup table Tab2_1 are modified to enable to associate, with each value that data can take, the value resulting from the successive application of the following operations:

the operation inverse to non-linear operation 2023;
an operation of unmasking of the data using mask Mask2_1_lin1;
non-linear operation 2023; and
an operation of masking with mask Mask2_2.

The new lookup table resulting from operation 2024 is a lookup table Tab2_2.

The next operation then is an operation of refreshment of mask 2025 (Refresh Mask) carried out in hardware fashion. During this operation, data C_Data2_Nlin are modified into data C_Data2_Nlin2 masked with mask Mask2_2. Refreshment operation 2025 is a search from lookup table Tab2_2 for the value corresponding to masked data C_Data2_Nlin, to deliver masked data C_Data2_Nlin2. According to a variant, mask Mask2_2 may be equal to mask Mask2_1_lin1.

The execution of data path 202 continues with the application of a second linear operation 2026 (Op Lin 2) to masked data C_Data2_Nlin2 in software fashion. The result of operation 2025 is masked data C_Data2_lin2. A second linear operation 2027 (Op Lin 2), identical to operation 2026 is, in parallel, applied to the mask Mask2_2 of masked data C_Data2_Nlin2 in hardware fashion. The result of operation 2027 is a mask Mask2_2_lin2. At this stage, it is possible to unmask masked data C_Data2_lin2 with mask Mask2_2_lin2.

The operations of data path 202 are finished for the first round. Data C_Data2_lin2, mask Mask2_2_lin2, and lookup table Tab2_2 may be fed back instead of, with respect to, data C_Data2, of mask Mask2_2, and of lookup table Tab2_1 to start the next round.

As a summary, as for the embodiment of FIG. 3, to apply the data path, each linear operation is applied in parallel to the masked data in software fashion and to their mask in hardware fashion. Further, each non-linear operation is followed by a mask refreshment operation. Further, a lookup table used to implement the mask refreshment operation should be updated, or refreshed, before the implementation of the mask refreshment operation if the last operation applied to the data is a linear operation. According to a variant, if a linear operation does not modify the mask, then said operation is not applied to the mask in parallel with the masked data.

This embodiment has the same advantages as the implementation mode described in relation with FIG. 3.

Further, another advantage of this embodiment is that it enables to avoid masking and unmasking operations during the execution of the data path.

Still another advantage of this implementation mode is that the use of a lookup table enables to do away with the use of a masking circuit and of an unmasking circuit during the execution of data path 302, which enables to make this execution faster, and to reduce the physical size of assembly 21 of circuits of device 20. Device 20 is then more compact and more affordable.

Figure 5:
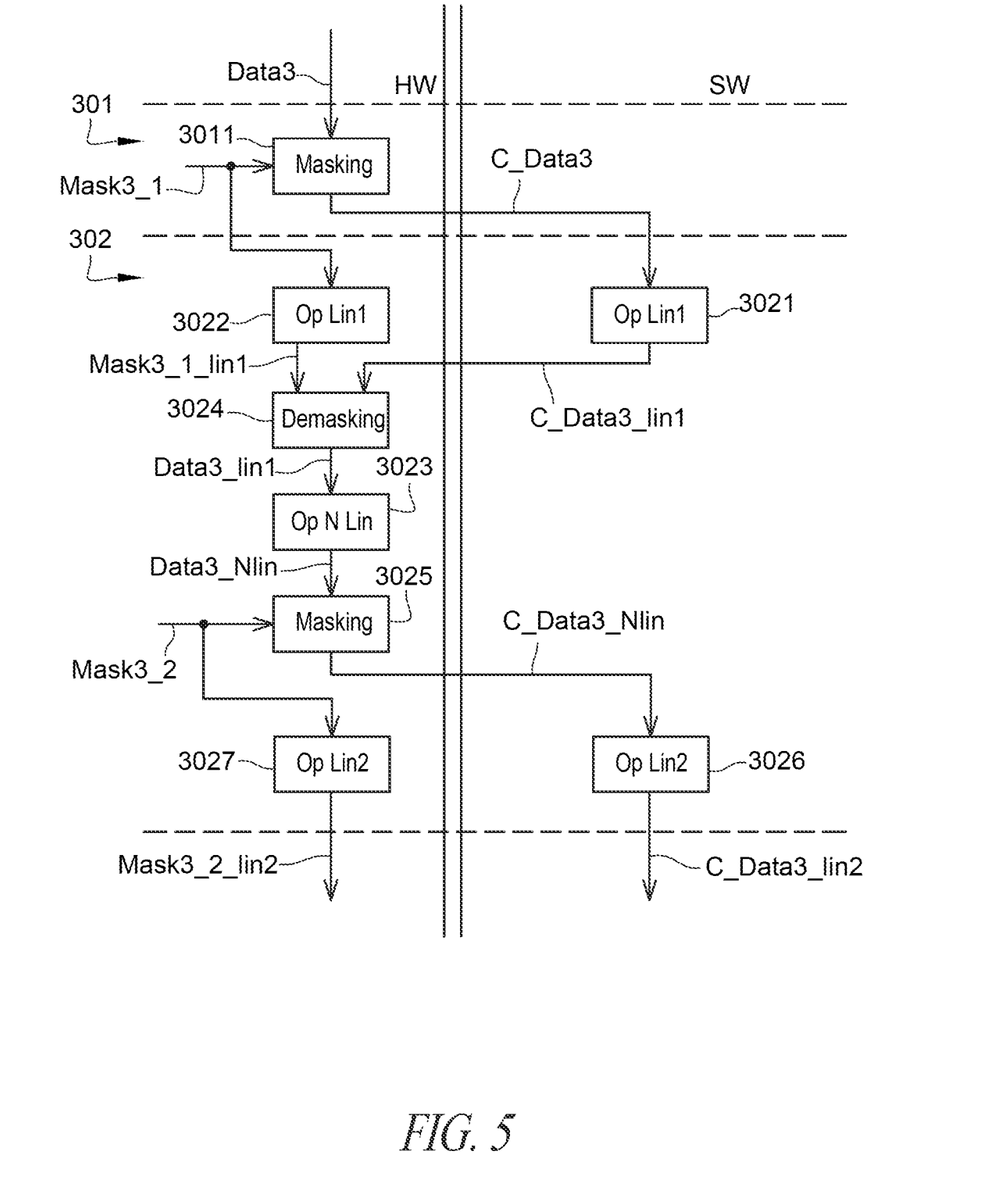
FIG. 5 schematically shows in the form of blocks steps of another protected implementation mode of a symmetrical cipher algorithm.

FIG. 5 schematically shows, in the form of blocks, steps of another implementation mode of the symmetrical cipher algorithm of the device 20 described in relation with FIG. 2.

In the example described in relation with FIG. 5, the non-linear operation of the data path is implemented in hardware fashion.

As in FIGS. 3 and 4, in FIG. 5, the operations shown on the left-hand side of the drawing are implemented in hardware fashion (HW) and the operations shown on the right-hand side of the drawing are implemented in software fashion (SW).

Further, the upper portion of the drawing shows the execution of the operations of an initialization step 301 (delimited in dotted lines) of the cipher algorithm and the lower portion of the drawing shows the execution of the operations of data path 302 (delimited in dotted lines) during a first round.

At initialization step 301, data Data3 to be ciphered are masked with a mask Mask3_1 during a masking operation 3011 (Masking). Masked data C_Data3 are then supplied. Data Data3 is represented as coming from the hardware part of the device executing the cipher algorithm, but, according to a variant, data Data3 may come from the software part of the device.

Then, the execution of data path 302 starts with the application of a first linear operation 3021 (Op Lin 1) to masked data C_Data3 in software fashion. The result of operation 3021 is masked data C_Data3_lin1. A first linear operation 3022 (Op Lin 1), identical to operation 3021 is, in parallel, applied to mask Mask3_1 of masked data C_Data3, in hardware fashion. The result of operation 3022 is a mask Mask3_1_lin1. At this stage, it is possible to unmask masked data C_Data3_lin1 with mask Mask3_1_lin1.

Then comes the execution of a non-linear operation 3023 (Op N Lin) applied to data C_Data3_lin1 in hardware fashion. To minimize the number of masking and/or unmasking operations, data C_Data3_lin1 are sent into circuits assembly 21, and are unmasked by an unmasking operation 3024 (Unmasking). The unmasking operation uses mask Mask3_1_lin1 to unmask data C_Data3_lin1, and outputs unmasked data Data3_lin1. Non-linear operation 3023 is then applied to data Data3_lin1 and outputs data Data3_Nlin.

Data Data3_Nlin are then masked by a masking operation 3025 (Masking), similar to the masking operation 3011 performed at initialization step 301. Operation 3025 enables to mask data Data3_Nlin with a new mask Mask3_2, different from mask Mask3_1. According to a variant, mask Mask3_2 may be equal to mask Mask3_1_lin1. Operation 3025 outputs masked data C_Data3_Nlin.

Unmasking operation 3024, non-linear operation 3023, and masking operation 3025 are executed by the same circuit of the circuits 21 of device 20, in such a way that avoids unmasked data being attainable in the circuits 21.

The execution of data path 302 continues with the application of a second linear operation 3026 (Op Lin 2) to masked data C_Data3_Nlin in software fashion. The result of operation 3026 is masked data C_Data3_lin2. A second linear operation 3027 (Op Lin 2), identical to operation 3026 is, in parallel, applied to mask Mask3_2 of masked data C_Data3_Nlin in hardware fashion. The result of operation 3027 is a mask Mask3_2_lin2. At this stage, it is possible to unmask masked data C_Data3_lin2 with mask Mask3_2_lin2.

The operations of data path 302 are finished for the first round. Data C_Data3_lin2 and mask Mask3_2_lin2 may be fed back instead of, with respect to, data C_Data3 and of mask Mask3_1 to start the next round.

As a summary, as for the embodiments of FIGS. 3 and 4, to apply the data path, each linear operation is applied in parallel to the masked data in software fashion and to their mask in hardware fashion. Further, each non-linear operation is surrounded with operations of unmasking and masking of the data to be processed. According to a variant, if a linear operation does not modify the mask, then said operation is not applied to the mask in parallel with the masked data.

This embodiment has the same advantages as the implementation mode described in relation with FIG. 3. Further, another advantage of this implementation mode is that by implementing non-linear operation 3023 in hardware fashion, the use of non-linear operation 3023 and of its inverse operation is limited as compared with the implementation modes described in relation with FIGS. 3 and 4.

Figure 6:
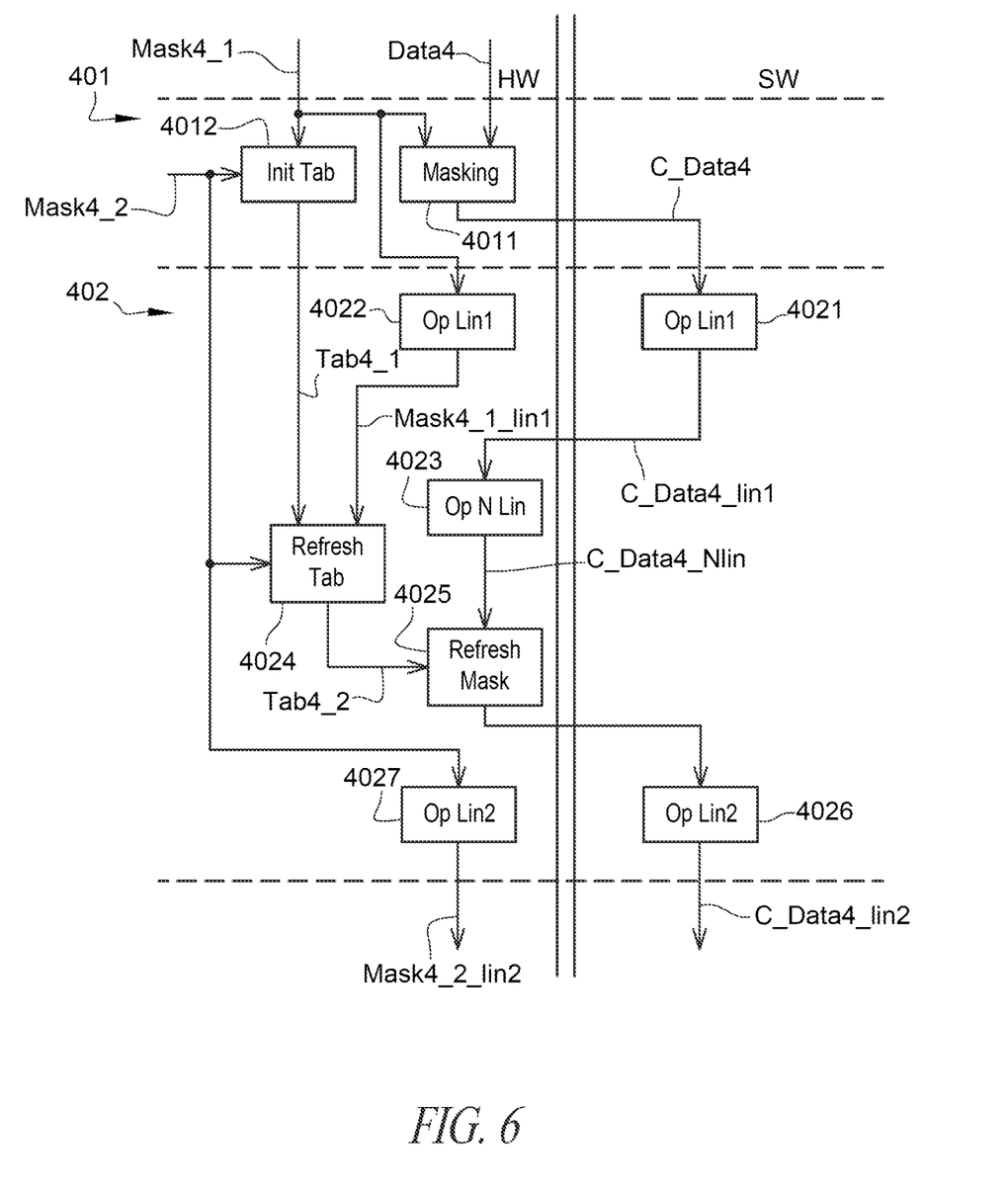
FIG. 6 schematically shows in the form of blocks steps of another protected implementation mode of a symmetrical cipher algorithm.

FIG. 6 schematically shows, in the form of blocks, steps of another implementation mode of the symmetrical cipher algorithm of the device 20 described in relation with FIG. 2.

In the example described in relation with FIG. 6, the initialization step and the data path of the algorithm are similar to the initialization step and to the data path described in relation with FIG. 5, with the difference that the cipher algorithm uses, as in FIG. 4, a lookup table.

In the example described in relation with FIG. 6 and as in FIG. 5, the non-linear operation of the data path is implemented in hardware fashion.

As in FIGS. 3 to 5, in FIG. 6, the operations shown on the left-hand side of the drawing are implemented in hardware fashion (HW) and the operations shown on the right-hand side of the drawing are implemented in software fashion (SW).

Further, the upper portion of the drawing shows the execution of the operations of an initialization step 401 (delimited in dotted lines) of the cipher algorithm and the lower portion of the drawing shows the execution of the operations of data path 402 (delimited in dotted lines) during a first round.

At initialization step 401, data Data4 to be ciphered are masked with a mask Mask4_1 during a masking operation 4011 (Masking). Masked data C_Data4 are then supplied. Data Data4 is represented as coming from the hardware part of the device executing the cipher algorithm, but, according to a variant, data Data4 may come from the software part of the device.

Further, an operation of initialization 4012 (Init Tab) of a lookup table is executed, during which a lookup table Tab4_1 is created. Operation 4012 is similar to the operation 2012 described in relation with FIG. 2.

The execution of data path 402 starts with the application of a first linear operation 4021 (Op Lin 1) to masked data C_Data4 in software fashion. The result of operation 4021 is masked data C_Data4_lin1. A first linear operation 4022 (Op Lin 1), identical to operation 4021 is, in parallel, applied to mask Mask4_1 of masked data C_Data4, in hardware fashion. The result of operation 4022 is a mask Mask4_1_lin1. At this stage, it is possible to unmask masked data C_Data4_lin1 with mask Mask4_1_lin1.

The execution of data path 402 continues with the application of a non-linear operation 4023 (Op N Lin) to data C_Data1_lin1, in hardware fashion. The result of operation 4023 is masked data C_Data4_Nlin.

An operation 4024 of refreshment of lookup table Tab4_1 is executed. During this step, the data of lookup table Tab4_1 are modified to enable to associate, with each value that data can take, the value resulting from the application, consecutively:
  of the operation inverse to non-linear operation 4023;
  of an operation of unmasking of the data by using mask Mask4_1_lin1;
  of non-linear operation 4023; and
  of an operation of masking with mask Mask4_2.

The new lookup table resulting from operation 4024 is a lookup table Tab4_2.

The new lookup table Tab4_2 is then used by an operation 4025 (Refresh Mask) of refreshment of the mask of masked data C_Data4_Nlin. Operation 4025 modifies the mask Mask4_1_lin1 used for the masking of data C_Data4_Nlin into mask Mask4_2. Refreshment operation 4025 is a search in lookup table Tab4_2 for the value corresponding to masked data C_Data4_Nlin, to deliver masked data C_Data4_Nlin2. According to a variant, mask Mask4_2 may be equal to mask Mask4_1_lin1.

The execution of data path 402 continues with the application of a second linear operation 4026 (Op Lin 2) to masked data C_Data4_Nlin in software fashion. The result of operation 4026 is masked data C_Data4_lin2. A second linear operation 4027 (Op Lin 2), identical to operation 4026 is, in parallel, applied to the mask Mask4_2 of masked data C_Data4_Nlin2 in hardware fashion. The result of operation 4027 is a mask Mask4_2_lin2. At this stage, it is possible to unmask masked data C_Data4_lin2 with mask Mask4_2_lin2.

The operations of data path 402 are finished for the first round. Data C_Data4_lin2, mask Mask4_2_lin2, and the lookup table Tab4_2 may be fed back instead of, with respect to, data C_Data4, of mask Mask4_2, and of lookup table Tab4_1 to start the next round.

As a summary, as for the embodiments of FIGS. 3 to 5, to apply the data path, each linear operation is applied in parallel to the masked data in software fashion and to their mask in hardware fashion. Further, each non-linear operation is followed by a table refreshment operation. Further, a lookup table used to implement the table refreshment operation should be updated, or refreshed, before the implementation of the table refreshment operation if the last operation applied to the data is a linear operation. According to a variant, if a linear operation does not modify the mask, then said operation is not applied to the mask in parallel with the masked data.

This implementation mode has the same advantages as the implementation mode described in relation with FIGS. 3 to 5. Further, another advantage of this implementation mode is that it enables to avoid masking and unmasking operations during the execution of the data path, which enables to make this execution faster, and to reduce the physical size of the circuits 21 of device 20. Device 20 is then more compact and more affordable.

Figure 7:
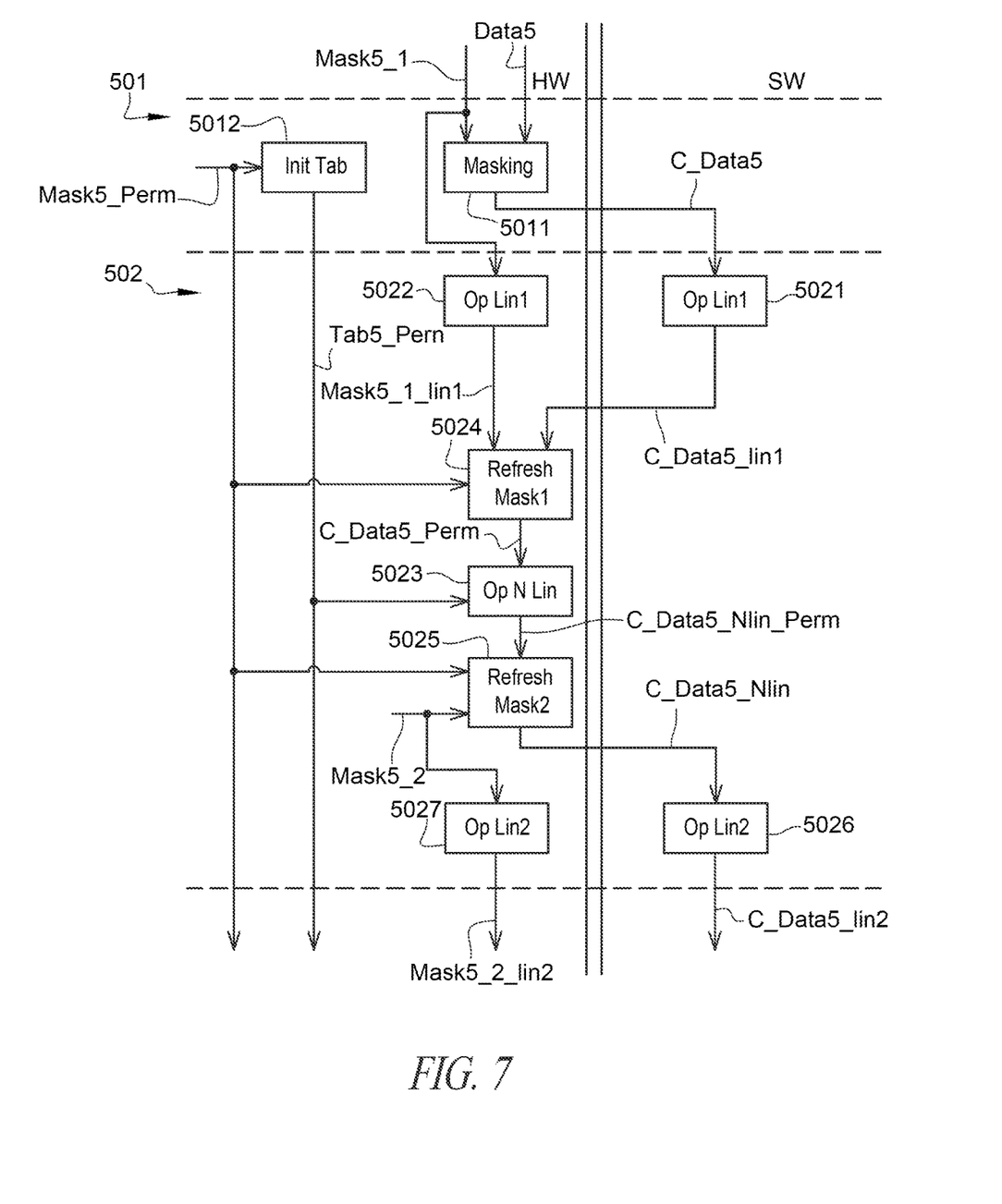
FIG. 7 schematically shows in the form of blocks steps of another protected implementation mode of a symmetrical cipher algorithm.

FIG. 7 schematically shows, in the form of blocks, steps of another implementation mode of the symmetrical cipher algorithm of the device 20 described in relation with FIG. 2.

In the example described in relation with FIG. 7, the initialization step and the data path of the algorithm are similar to the initialization step and to the data path described in relation with FIG. 6, with the difference that the data to be masked are always masked with a same permanent mask during the execution of operations in hardware form.

As in FIGS. 3 to 6, in FIG. 7, the operations shown on the left-hand side of the drawing are implemented in hardware fashion (HW) and the operations shown on the right-hand side of the drawing are implemented in software fashion (SW).

Further, the upper portion of the drawing shows the execution of the operations of an initialization step 501 (delimited in dotted lines) of the cipher algorithm and the lower portion of the drawing shows the execution of the operations of data path 502 (delimited in dotted lines) during a first round.

At initialization step 501, data Data5 to be ciphered are masked with a mask Mask5_1 during a masking operation 5011 (Masking). Masked data C_Data5 are then supplied. Data Data5 is represented as coming from the hardware part of the device executing the cipher algorithm, but, according to a variant, data Data5 may come from the software part of the device.

Further, an operation 5012 (Init Tab) of initialization of a lookup table Tab5_Perm is executed during step 501. Lookup table Tab5_Perm enables to associate, with each value that data masked with a mask Mask5_Perm can take, the value that would be taken by said data having been submitted to the following successive operations:
 an unmasking operation using mask Mask5_Perm;
 a non-linear operation of the algorithm described hereafter; and
 a new masking operation using mask Mask5_Perm.

The execution of data path 502 starts with the application of a first linear operation 5021 (Op Lin 1) to masked data C_Data5 in software fashion. The result of operation 5021 is masked data C_Data5_lin1. A first linear operation 5022 (Op Lin 1), identical to operation 5021 is, in parallel, applied to mask Mask5_1 of masked data C_Data5, in hardware fashion. The result of operation 5022 is a mask Mask5_1_lin1. At this stage, it is possible to unmask masked data C_Data5_lin1 with mask Mask5_1_lin1.

The execution of data path 502 continues with the application of a non-linear operation 5023 (Op N Lin) of the algorithm to data C_Data5_lin1 in hardware fashion. For this purpose, masked data C_Data5_lin1 are submitted to a first mask refreshment operation 5024 (Refresh Mask 1) during which the mask Mask5_1_lin1 used for the masking of data C_Data5_lin1 is modified into mask Mask5_Perm. More particularly, mask refreshment operation 5024 comprises the following operations:
 an unmasking operation, using mask Mask5_1_lin1; and
 a new masking operation using mask Mask5_Perm.

The result of operation 5024 is masked data C_Data5_Perm.

Non-linear operation 5023 is then applied to data C_Data5_Perm by using lookup table Tab5_Perm. The result of operation 5023 is masked data C_Data5_NlinPerm. As previously explained, the use of lookup table Tab5_Perm enables to deliver data masked by mask Mask5_Perm.

The next operation is a new mask refreshment operation 5025 (Refresh Mask 2) applied to masked data C_Data5_NlinPerm. During this operation, the mask Mask5_Perm used for the masking of data C_Data5_NlinPerm is modified by using a mask Mask5_2. Mask Mask5_2 is different, or not, from mask Mask5_1. More particularly, mask refreshment operation 5025 comprises the following operations:
 an unmasking operation, using mask Mask5_Perm; and
 a masking operation using mask Mask5_2.

The result of operation 5025 is data C_Data5_Nlin masked with mask Mask5_2.

The execution of data path 502 continues with the application of a second linear operation 5026 (Op Lin 2) to masked data C_Data5_Nlin in software fashion. The result of operation 5026 is masked data C_Data5_lin2. A second linear operation 5027 (Op Lin 2), identical to operation 5026 is, in parallel, applied to mask Mask5_2 of masked data C_Data5_Nlin in hardware fashion. The result of operation 5027 is a mask Mask5_2_lin2. At this stage, it is possible to unmask data C_Data5_lin2 with mask Mask5_2_lin2.

The operations of data path 502 are finished for the first round. Data C_Data5_lin2, mask Mask5_2_lin2, and the lookup table Tab5_Perm may be fed back instead of, with respect to, data C_Data5, of mask Mask5_1, and of lookup table Tab5_Perm to start the next round.

As a summary, as for the embodiments of FIGS. 3 to 6, to apply the data path, each linear operation is applied in parallel to the masked data in software fashion and to their mask in hardware fashion. Further, each non-linear operation is surrounded with mask changing operations and is implemented by means of a lookup table.

This implementation mode has the same advantages as the implementation mode described in relation with FIGS. 3 to 5. Further, another advantage of this implementation mode is that it enables to avoids operations of refreshment of the lookup table during the execution of the data path, which enables to make this execution faster.

Further, the various embodiments described in relation with FIGS. 3 to 7 may enable, in certain cases, to decrease the size of the assembly of assembly 21 of circuits capable of implementing the operations of the data path of the ciphering algorithm of device 20 while keeping computing performances, which thus enables to make device 20 more compact and more affordable.

Another advantage of the embodiments described in relation with FIGS. 3 to 7 is that they enable a more protected execution of known cipher algorithms. As a matter of fact, the data stays masked during all its hardware and software processing, which offers a mathematical protection of the cipher algorithm. Moreover, this execution makes a physical attack more difficult, offering an additional protection to the cipher algorithm.

Various embodiments and variants have been described. Those skilled in the art will understand that certain features of these various embodiments and variants may be combined, and other variants will occur to those skilled in the art. The implementation modes described in relation with FIGS. 3 to 7 may be applied to any type of cipher algorithm in rounds, that is, to cipher algorithms having their data path comprising at least one linear operation and at least one non-linear operation arranged in any way. As an example, the cipher algorithm is a block cypher algorithm, for example: AES (Advanced Encryption Standard), SM4, and GOST R 34.12-2015, or a stream cypher algorithm.

In particular, the AES (Advanced Encryption Standard) is a known cipher algorithm in rounds. The data path implemented by the AES is formed of the three following successive cipher operations:
  a substitution operation (Sub Bytes), which is a non-linear operation;
  a rows shifting operation (Shift Rows), which is a linear operation; and
  a column mixing operation (Mix Columns), which is a linear operation.

Finally, the practical implementation of the described embodiments and variations is within the abilities of those skilled in the art based on the functional indications given hereabove. In particular, it will be within the abilities of those skilled in the art to adapt the implementation modes to data paths of cipher algorithms comprising a plurality of non-linear operations, and more than two linear operations.

Example embodiments are summarized below, with example references to the drawings and to the tables discussed herein provided in parenthesis.

In an embodiment, a method of implementation, by an electronic device (20), of a symmetrical data cipher algorithm in rounds comprises the steps implementing: data masking and unmasking operations (1011, 1024; 2011, 2025; 3011, 3024, 3025; 4011, 4025; 5011, 5024, 5025) performed in hardware fashion; linear operations (1021, 1025; 2021, 2026; 3021, 3026; 4021, 4026; 5021, 5026) applied to the data in software fashion; and non-linear operations (1023; 2023; 3023; 4023; 5023) in software or hardware fashion. In an embodiment, the symmetrical data cipher algorithm comprises a data path (12) and a key path (11), said masking and unmasking operations (1011, 1024; 2011, 2025; 3011, 3024, 3025; 4011, 4025; 5011, 5024, 5025), said linear operations (1021, 1025; 2021, 2026; 3021, 3026; 4021, 4026; 5021, 5026), and said non-linear operations (1023; 2023; 3023; 4023; 5023) being operations of the data path.

In an embodiment, said masking and unmasking operations comprise masking operations (1011; 2011; 3011, 3025; 4011; 5011), unmasking operations (3024), and mask refreshment operations (1024; 2025; 4025; 5024, 5025). In an embodiment, each non-linear operation (1023; 2023; 4023; 5023) is followed by a masking or unmasking operation (1024; 2025; 4025; 5025). In an embodiment, each non-linear operation (1023; 2023; 4023; 5023) is followed by a masking or unmasking operation (1024; 2025; 4025; 5025), and each non-linear operation (1023; 2023; 4023; 5023) is followed by a mask refreshment operation (1024; 2025; 4025; 5025). In an embodiment, each non-linear operation (1023; 2023; 4023; 5023) is followed by a masking or unmasking operation (1024; 2025; 4025; 5025), and each non-linear operation (3023) is followed by a masking operation (3025). In an embodiment, each non-linear operation (3023; 5023) is preceded by a masking and unmasking operation (3024; 5024). In an embodiment, each non-linear operation (3023; 5023) is preceded by a masking and unmasking operation (3024; 5024), and each non-linear operation (3023) is preceded by an unmasking operation (3024). In an embodiment, each non-linear operation (3023; 5023) is preceded by a masking and unmasking operation (3024; 5024), and each non-linear operation (5023) is preceded by a mask refreshment operation (5024). In an embodiment, said mask refreshment operations (2025; 4025) are implemented by using a lookup table (Tab2_2; Tab4_2). In an embodiment, the cipher algorithm further comprises steps implementing lookup table refreshment operations (2024; 4024). In an embodiment said non-linear operations (5023) are implemented by using a lookup table (Tab5_Perm). In an embodiment, the cipher algorithm is a block cypher algorithm, for example: AES (Advanced Encryption Standard), SM4, and GOST R 34.12-2015, or a stream cypher algorithm. In an embodiment, the cipher algorithm in rounds uses a masking using a logical addition function.

In an embodiment, an electronic device (20) implements a symmetrical cipher algorithm comprising the steps implementing: data masking and unmasking operations (1011, 1024; 2011, 2025; 3011, 3024, 3025; 4011, 4025; 5011, 5024, 5025) in hardware fashion; linear operations (1021, 1025; 2021, 2026; 3021, 3026; 4021, 4026; 5021, 5026) applied to the data in software fashion; and non-linear operations (1023; 2023; 3023; 4023; 5023) in software or hardware fashion. In an embodiment, the symmetrical data cipher algorithm comprises a data path (12) and a key path (11), said masking and unmasking operations (1011, 1024; 2011, 2025; 3011, 3024, 3025; 4011, 4025; 5011, 5024, 5025), said linear operations (1021, 1025; 2021, 2026; 3021, 3026; 4021, 4026; 5021, 5026), and said non-linear operations (1023; 2023; 3023; 4023; 5023) being operations of the data path.

In an embodiment, said masking and unmasking operations comprise masking operations (1011; 2011; 3011, 3025;

4011; 5011), unmasking operations (3024), and mask refreshment operations (1024; 2025; 4025; 5024, 5025). In an embodiment, each non-linear operation (1023; 2023; 4023; 5023) is followed by a masking or unmasking operation (1024; 2025; 4025; 5025). In an embodiment, each non-linear operation (1023; 2023; 4023; 5023) is followed by a masking or unmasking operation (1024; 2025; 4025; 5025), and each non-linear operation (1023; 2023; 4023; 5023) is followed by a mask refreshment operation (1024; 2025; 4025; 5025). In an embodiment, each non-linear operation (1023; 2023; 4023; 5023) is followed by a masking or unmasking operation (1024; 2025; 4025; 5025), and each non-linear operation (3023) is followed by a masking operation (3025). In an embodiment, each non-linear operation (3023; 5023) is preceded by a masking and unmasking operation (3024; 5024). In an embodiment, each non-linear operation (3023; 5023) is preceded by a masking and unmasking operation (3024; 5024), and each non-linear operation (3023) is preceded by an unmasking operation (3024). In an embodiment, each non-linear operation (3023; 5023) is preceded by a masking and unmasking operation (3024; 5024), and each non-linear operation (5023) is preceded by a mask refreshment operation (5024). In an embodiment, said mask refreshment operations (2025; 4025) are implemented by using a lookup table (Tab2_2; Tab4_2). In an embodiment, the cipher algorithm further comprises steps implementing lookup table refreshment operations (2024; 4024). In an embodiment said non-linear operations (5023) are implemented by using a lookup table (Tab5_Perm). In an embodiment, the cipher algorithm is a block cypher algorithm, for example: AES (Advanced Encryption Standard), SM4, and GOST R 34.12-2015, or a stream cypher algorithm. In an embodiment, the cipher algorithm in rounds uses a masking using a logical addition function.

In an embodiment, a method comprises: executing a plurality of rounds of a symmetrical data cipher algorithm using an electronic device, the electronic device including hardware data processing circuitry and software data processing circuitry; and protecting the execution of the plurality of rounds of the symmetrical data cipher algorithm, the protecting including: executing data masking and unmasking operations using the hardware data processing circuitry; executing linear operations applied to data using the software data processing circuitry; executing linear operations applied to masks using the hardware data processing circuitry; and executing non-linear operations applied to data using one of the hardware data processing circuitry or the software data processing circuitry. In an embodiment, the method comprises: applying a linear operation to a mask in parallel with application of a same linear operation to data. In an embodiment, the symmetrical data cipher algorithm employs a data path and a key path, said data masking and unmasking operations, said linear operations applied to data, and said non-linear operations applied to data being operations of the data path. In an embodiment, said data masking and unmasking operations comprise masking operations, unmasking operations, and mask refreshment operations. In an embodiment, each non-linear operation is followed by a masking or unmasking operation. In an embodiment, each non-linear operation is followed by a mask refreshment operation. In an embodiment, each non-linear operation is followed by a masking operation. In an embodiment, each non-linear operation is preceded by a masking and unmasking operation. In an embodiment, each non-linear operation is preceded by an unmasking operation. In an embodiment, each non-linear operation is preceded by a mask refreshment operation. In an embodiment, said mask refreshment operations are implemented using one or more lookup tables. In an embodiment, the method comprises executing lookup table refreshment operations. In an embodiment, non-linear operations executed by the hardware processing circuitry are executed using one or more lookup tables. In an embodiment, the cipher algorithm is a block cypher algorithm or a stream cypher algorithm. In an embodiment, data masking operations are executed using a logical addition function.

In an embodiment, a device comprises: hardware data processing circuitry; and software data processing circuitry coupled to the hardware data processing circuitry, wherein the device, in operation: executes a plurality of rounds of a symmetrical data cipher algorithm; and protects the execution of the plurality of rounds of the symmetrical data cipher algorithm, wherein the protecting includes: executing data masking and unmasking operations using the hardware data processing circuitry; executing linear operations applied to data using the software data processing circuitry; executing linear operations applied to masks using the hardware data processing circuitry; and executing non-linear operations applied to data using one of the hardware data processing circuitry or the software data processing circuitry. In an embodiment, the protecting includes: applying a linear operation to a mask in parallel with application of a same linear operation to data. In an embodiment, the symmetrical data cipher algorithm employs a data path and a key path, said data masking and unmasking operations, said linear operations applied to data, and said non-linear operations applied to data being operations of the data path. In an embodiment, said data masking and unmasking operations comprise masking operations, unmasking operations, and mask refreshment operations. In an embodiment, each non-linear operation is followed by a mask refreshment operation. In an embodiment, each non-linear operation is preceded by an unmasking operation. In an embodiment, each non-linear operation is preceded by a mask refreshment operation. In an embodiment, said mask refreshment operations are implemented using one or more lookup tables. In an embodiment, non-linear operations executed by the hardware processing circuitry are executed using one or more lookup tables.

In an embodiment, a system comprises: an application processor; and cryptographic circuitry coupled to the application processor and including hardware processing circuitry and software processing circuitry, wherein the cryptographic circuitry, in operation: executes a plurality of rounds of a symmetrical data cipher algorithm; and protects the execution of the plurality of rounds of the symmetrical data cipher algorithm, wherein the protecting includes: executing data masking and unmasking operations using the hardware processing circuitry; executing linear operations applied to data using the software processing circuitry; executing linear operations applied to masks using the hardware processing circuitry; and executing non-linear operations applied to data using one of the hardware processing circuitry or the software processing circuitry. In an embodiment, the protecting includes: applying a linear operation to a mask in parallel with application of a same linear operation to data. In an embodiment, the symmetrical data cipher algorithm employs a data path and a key path, said data masking and unmasking operations, said linear operations applied to data, and said non-linear operations applied to data being operations of the data path. In an embodiment, said data masking and unmasking operations comprise masking operations, unmasking operations, and mask refreshment operations. In an embodiment, the hardware processing circuitry comprises one or more lookup tables.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing a plurality of rounds of a symmetrical data cipher algorithm using an electronic device, the electronic device including hardware data processing circuitry and software data processing circuitry; and
protecting the execution of the plurality of rounds of the symmetrical data cipher algorithm against attacks during the execution of the plurality of rounds, the protecting including:
executing data masking and unmasking operations using the hardware data processing circuitry;
executing linear operations applied to data using the software data processing circuitry;
executing linear operations applied to masks using the hardware data processing circuitry; and
executing non-linear operations applied to data during rounds of the plurality of rounds using one of the hardware data processing circuitry or the software data processing circuitry, wherein each non-linear operation of the non-linear operations applied to data during a current round of the plurality of rounds is preceded in the current round by a mask refreshment operation implemented using one or more lookup tables.

2. The method of claim 1, comprising:
applying a linear operation to a mask in parallel with application of a same linear operation to data.

3. The method according to claim 1, wherein the symmetrical data cipher algorithm employs a data path and a key path, said data masking and unmasking operations, said linear operations applied to data, and said non-linear operations applied to data being operations of the data path.

4. The method according to claim 1, wherein said data masking and unmasking operations comprise masking operations, unmasking operations, and mask refreshment operations.

5. The method of claim 4, wherein each non-linear operation is followed by a mask refreshment operation.

6. The method according to claim 4, wherein each non-linear operation is followed by a masking operation.

7. The method according to claim 4, wherein each non-linear operation is preceded by an unmasking operation.

8. The method according to claim 1, wherein each non-linear operation is followed by a masking or unmasking operation.

9. The method according to claim 1, wherein each non-linear operation is preceded by a masking and unmasking operation.

10. The method according to claim 1, comprising executing lookup table refreshment operations.

11. The method according to claim 1, wherein non-linear operations executed by the hardware processing circuitry are executed using one or more lookup tables.

12. The method according to claim 1, wherein the cipher algorithm is a block cypher algorithm or a stream cypher algorithm.

13. The method according to claim 1, wherein data masking operations are executed using a logical addition function.

14. The method according to claim 1, comprising:
in a first round of the plurality of rounds, initializing a lookup table of one or more lookup tables; and
in a second round of the plurality of rounds, refreshing the lookup table prior to performing a mask refreshment operation implemented using the lookup table.

15. A device, comprising:
hardware data processing circuitry; and
software data processing circuitry coupled to the hardware data processing circuitry, wherein the device, in operation:
executes a plurality of rounds of a symmetrical data cipher algorithm; and
protects the execution of the plurality of rounds of the symmetrical data cipher algorithm against attacks during the execution of the plurality of rounds, wherein the protecting includes:
executing data masking and unmasking operations using the hardware data processing circuitry;
executing linear operations applied to data using the software data processing circuitry;
executing linear operations applied to masks using the hardware data processing circuitry; and
executing non-linear operations applied to data during rounds of the plurality of rounds using one of the hardware data processing circuitry or the software data processing circuitry, wherein each non-linear operation of the non-linear operations applied to data during a current round of the plurality of rounds is preceded in the current round by a mask refreshment operation implemented using one or more lookup tables.

16. The device of claim 15, wherein the protecting includes:
applying a linear operation to a mask in parallel with application of a same linear operation to data.

17. The device according to claim 15, wherein the symmetrical data cipher algorithm employs a data path and a key path, said data masking and unmasking operations, said linear operations applied to data, and said non-linear operations applied to data being operations of the data path.

18. The device according to claim 15, wherein said data masking and unmasking operations comprise masking operations, unmasking operations, and mask refreshment operations.

19. The device of claim 18, wherein each non-linear operation is followed by a mask refreshment operation.

20. The device according to claim 18, wherein each non-linear operation is preceded by an unmasking operation.

21. The device according to claim 18, wherein said mask refreshment operations are implemented using one or more lookup tables.

22. The device according to claim 18, wherein non-linear operations executed by the hardware processing circuitry are executed using one or more lookup tables.

23. A system, comprising:
an application processor; and
cryptographic circuitry coupled to the application processor and including hardware processing circuitry and software processing circuitry, wherein the cryptographic circuitry, in operation:
executes a plurality of rounds of a symmetrical data cipher algorithm; and
protects the execution of the plurality of rounds of the symmetrical data cipher algorithm against software attacks during the execution of the plurality of rounds, wherein the protecting includes:
executing data masking and unmasking operations using the hardware processing circuitry;
executing linear operations applied to data using the software processing circuitry;
executing linear operations applied to masks using the hardware processing circuitry; and
executing non-linear operations applied to data during rounds of the plurality of rounds using one of the hardware processing circuitry or the software processing circuitry, wherein each non-linear operation of the non-linear operations applied to data during a current round of the plurality of rounds is preceded in the current round by a mask refreshment operation implemented using one or more lookup tables.

24. The system of claim 23, wherein the protecting includes:
applying a linear operation to a mask in parallel with application of a same linear operation to data.

25. The system according to claim 23, wherein the symmetrical data cipher algorithm employs a data path and a key path, said data masking and unmasking operations, said linear operations applied to data, and said non-linear operations applied to data being operations of the data path.

26. The system according to claim 23, wherein said data masking and unmasking operations comprise masking operations, unmasking operations, and mask refreshment operations.

27. The system according to claim 23, wherein the hardware processing circuitry comprises one or more lookup tables.

28. The system according to claim 27, wherein:
in a first round of the plurality of rounds, a lookup table of one or more lookup tables is initialized; and
in a second round of the plurality of rounds, the lookup table is refreshed prior to a mask refreshment operation implemented using the lookup table.

* * * * *